C. B. RUSK.
TRUCK BRAKE AND HANDLE.
APPLICATION FILED JAN. 3, 1914.

1,134,015.

Patented Mar. 30, 1915.
2 SHEETS—SHEET 1.

Witnesses

Inventor
C. B. Rusk,
By Victor J. Evans
Attorney

C. B. RUSK.
TRUCK BRAKE AND HANDLE.
APPLICATION FILED JAN. 3, 1914.
1,134,015.
Patented Mar. 30, 1915.
2 SHEETS—SHEET 2.
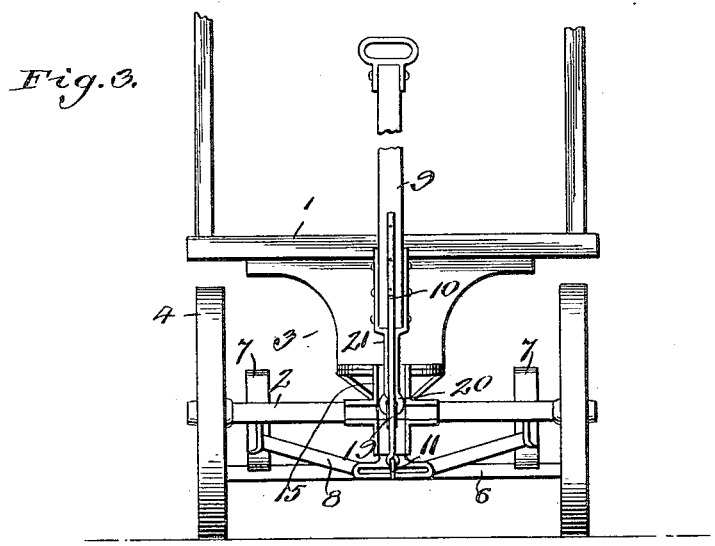
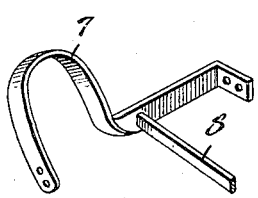
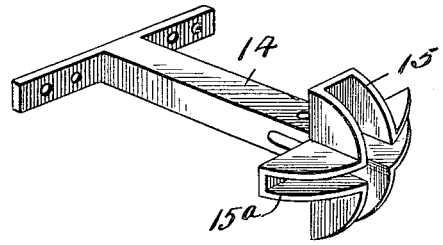
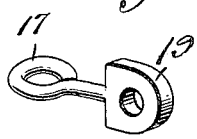
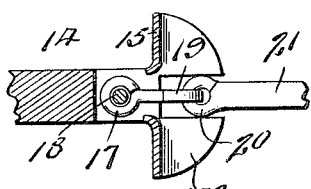
Inventor
C. B. Rusk,
Witnesses
By Victor J. Evans
Attorney

UNITED STATES PATENT OFFICE.

CHAUNCEY B. RUSK, OF GALION, OHIO.

TRUCK BRAKE AND HANDLE.

1,134,015.  Specification of Letters Patent.  Patented Mar. 30, 1915.

Application filed January 3, 1914.  Serial No. 810,204.

*To all whom it may concern:*

Be it known that I, CHAUNCEY B. RUSK, a citizen of the United States, residing at Galion, in the county of Crawford and State of Ohio, have invented new and useful Improvements in Truck Brakes and Handles, of which the following is a specification.

Trucks generally used for moving baggage, express packages and the like are equipped with a brake mechanism; hence when it is required to hold such trucks against movement they are either chocked or have a stake passed between the spokes of the wheels. Either one of such means is objectionable, the use of the stake because it is not always possible to readily remove the same or the use of the chock because the same is not always conveniently at hand. Moreover the handle, by means of which the truck is drawn, protrudes and often proves a stumbling block to trip persons who are not on the alert to avoid the obstruction presented by the handle.

The present invention provides a brake mechanism for the type of trucks herein before stated which is adapted to be automatically operated by a movement of the handle, such handle also serving as means to hold the brake released or in action.

The invention provides a novel and simple form of brake and peculiar mountings and connections for the handle whereby the brake may be applied or released by throwing the handle upward or downward.

The invention consists of the novel features, details of construction and combination of parts, which hereinafter will be more particularly set forth, illustrated in the accompanying drawings, and pointed out in the appended claims.

Figure 1:
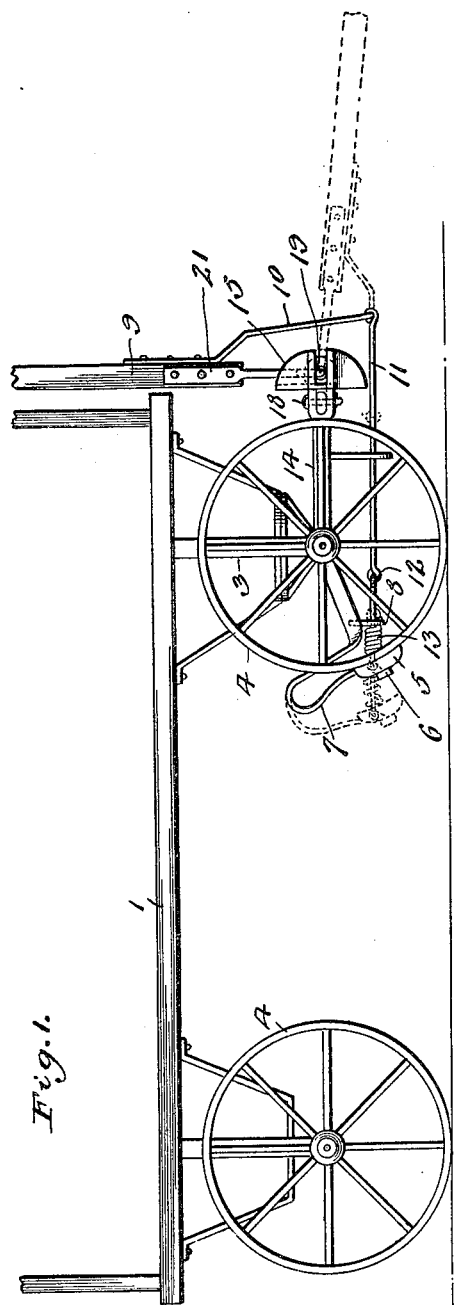
Figure 2:
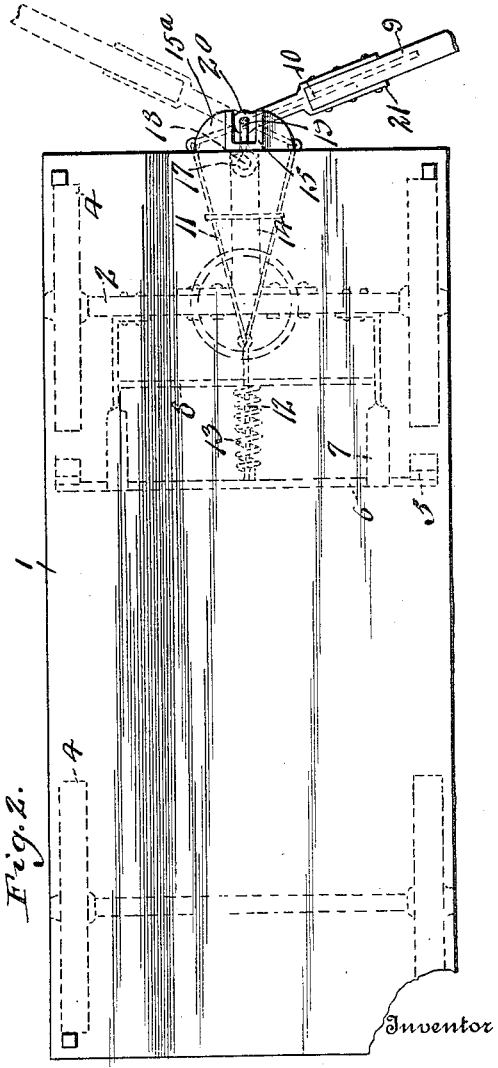

Figure 1 is a side view of a truck provided with a brake mechanism embodying the invention, the full lines showing the relation of the parts when the brake is set and the dotted lines illustrating the position of the parts when the brake is released. Fig. 2 is a top plan view, the dotted lines showing the position of the handle when swung to the right and to the left. Fig. 3 is a front view. Fig. 4 is a detail view of one of the spring brackets which is attached to the axle and supports the brake beam. Fig. 5 is a detail view of the draft bar. Fig. 6 is a detail view of the coupler between the draft bar. Fig. 7 is an enlarged horizontal section of the draft bar coupler and handle connection.

Corresponding and like parts are referred to in the following description, and indicated in all the views of the drawings, by the same reference characters.

The body of the truck is indicated by the numeral 1 and may be of any construction or design. The axle 2 is secured in any manner to the bolster 3. The wheels 4 are mounted upon the arms or spindles of the axle in any well known manner. Brake shoes 5 are arranged to engage with the wheels 4 and are carried by means of a brake beam 6 which in turn is attached to spring brackets 7 which are secured in any manner to the axle 2. A cross piece 8 connects the brackets 7. The rear parts of the brackets 7 are bent into the form of loops which preferably extend in an upward direction. The loops form flexible supports for the brake beam 6, so that the latter can be moved toward the front wheels to effect engagement between the brake shoes and the said front wheels. This is indicated most clearly by the dotted lines in Figs. 1 and 2. The truck handle 9 is connected with the brake beam 6 in such a manner as to set the brake when thrown into upright position as indicated by the full lines in Fig. 1 and to hold the brake out of action when turned into a horizontal position as indicated by the dotted lines in said Fig. 1. The handle 9 is mounted in a manner to receive both a vertical and lateral pivotal movement. An extension 10 of the truck handle is connected by means of a link 11 with a rod 12 extending forward from the brake beam 6 and attached thereto. A helical spring 13 is mounted upon the rod or bar 12 and is confined between the brake beam 6 and cross bar 8 for a purpose to be hereinafter explained. The extension 10 of the truck handle preferably consists of a bar of iron which is secured in any manner to the inner end of the truck handle and which projects so as to extend below a line passing horizontally through the pivot supports of the truck handle, said part 10 being off set in its length to admit of its lower end clearing the draft bar to which the truck handle is connected.

The draft bar 14 is secured at its rear end to the axle 2 and as indicated said draft bar has lateral extensions at its rear end which are bolted to the axle 2. The draft bar is provided at its front end with a head in which is formed intersecting vertical and transverse openings, such openings being defined by means of vertical flanges 15 and horizontal flanges 15ª constituting guides to direct the handle 9 in its vertical and transverse pivotal movements. A coupler 17 is connected to the head of the draft bar by means of a pin 18 which passes through vertical alined openings in the parts 14 and 17. The coupler 17 is formed at its front end with an eye 19 which is engaged by means of an eye 20 at the lower end of an iron 21 secured to the rear end of the handle 9. The interlocking of the eyes 19 and 20 is coincident with the point of intersection of the vertical and transverse openings formed in the head of the draft bar thereby admitting of the handle moving vertically and transversely.

When the handle 9 is in upright position the brake is set and when in horizontal position the brake is released. When the brake is set the handle is thrown into upright position as indicated by the full lines in Fig. 1 and is held elevated by the action of the spring 13. It is to be understood that when the handle is moved to a position intermediate between the vertical and horizontal the brake is released and the handle may be used in the ordinary manner for moving the truck and directing the same.

The spring 13 is of the contractile helical type and is attached at one end to the fixed cross piece 8 and at its opposite end to a brake beam 6. When the truck handle 9 is in upright position, the spring 13 is contracted and draws the brake beam 6 forward and applies the brakes and at the same time exerts a forward push on the lower end of the bar 10 forming the extension of the truck handle through the link 11, thereby holding such truck handle elevated. When the outer portion of the truck handle is lowered and moved to the right or the left of the space between the vertical flanges 15 and into the space formed between the horizontal flanges 15ª, such truck handle is held in the lowered position with the brakes released as indicated by the dotted lines in Fig. 2.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A draft bar for trucks provided at its forward end with a head, vertical means thereon, horizontal means traversing the vertical means, a handle pivotally connected with the bar and free to swing with relation to the said bar and second named means, stop walls adjacent the vertical means to hold the handle against horizontal adjustment, stop walls adjacent the horizontal means to hold the handle against vertical adjustment, and a brake element carried by said handle.

2. In combination, a draft bar having a head in which is formed intersecting vertical and horizontal openings, a truck handle having pivotal connection with the head of the draft bar and adapted to move in the vertical and horizontal openings thereof, a brake, and connecting means between such brake and truck handle.

3. In combination, a draft bar having intersecting vertical and horizontal openings, a coupler connected to the draft bar and having an eye in coincident position with the point of intersection of the vertical and horizontal openings of the draft bar head, a handle engaging the eye of the coupler and adapted to swing vertically and horizontally, a brake, and connecting means between the brake and handle.

In testimony whereof I affix my signature in presence of two witnesses.

CHAUNCEY B. RUSK.

Witnesses:
CHARLES H. MUELLER,
JOHN H. MUELLER.